(12) United States Patent
Tanaka et al.

(10) Patent No.: US 6,703,751 B2
(45) Date of Patent: Mar. 9, 2004

(54) DYNAMO-ELECTRIC MACHINE

(75) Inventors: Toshinori Tanaka, Tokyo (JP); Akihiro Daikoku, Tokyo (JP); Kyouhei Yamamoto, Tokyo (JP); Kei Yonemori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 55 days.

(21) Appl. No.: 09/931,563

(22) Filed: Aug. 17, 2001

(65) Prior Publication Data

US 2002/0113514 A1 Aug. 22, 2002

(30) Foreign Application Priority Data

Feb. 2, 2001 (JP) ......................................... 2001-026670

(51) Int. Cl.[7] ........................... H02K 23/30; H02K 3/28; H02K 3/51
(52) U.S. Cl. ..................... 310/198; 310/195; 310/197; 310/225; 310/234
(58) Field of Search .................................. 310/197, 179, 310/180, 42, 234, 264, 224, 195, 225, 198, 203, 206; 242/1.1 R, 432

(56) References Cited

U.S. PATENT DOCUMENTS

| 2,743,386 | A | * | 4/1956 | Diehl | 310/202 |
|---|---|---|---|---|---|
| 3,913,220 | A | * | 10/1975 | Miller | 29/597 |
| 4,404,485 | A | * | 9/1983 | Ban et al. | 310/198 |
| 4,437,028 | A | * | 3/1984 | Ikeda | 310/198 |
| 4,459,503 | A | * | 7/1984 | Kropp et al. | 310/198 |
| 4,857,790 | A | * | 8/1989 | Kamiyama et al. | 310/234 |
| 5,044,065 | A | * | 9/1991 | Dyke et al. | 29/597 |
| 5,191,257 | A | * | 3/1993 | Sugiyama | 310/198 |
| 6,043,581 | A | * | 3/2000 | Tanaka et al. | 310/197 |
| 6,388,354 | B1 | * | 5/2002 | Tanaka et al. | 310/179 |
| 6,462,454 | B2 | * | 10/2002 | Yamamoto et al. | 310/207 |

* cited by examiner

Primary Examiner—Burton Mullins
(74) Attorney, Agent, or Firm—Sughrue Mion, PLLC

(57) ABSTRACT

The present invention provides a dynamo-electric machine that suppresses vibrations caused by imbalance due to electromagnetic forces and that also suppresses imbalance in magnetic attraction forces generated owing to the difference in the number of coil portions among electric circuit portions. This dynamo-electric machine comprises an armature having a winding consisting of a plurality of coil portions each formed by lap-winding a conductor between a corresponding pair of slots formed in an outer circumferential surface portion of a core fixed to a shaft in such a way as to extend in an axial direction thereof, a commutator fixed to an end portion of the shaft and having a plurality of segments to which both end sections of said coil portions are electrically connected, brushes made to respectively abut against the surfaces of the segments of the commutator, and equalizers for connecting said segments, which are to be at equal electric potential, to each other. Moreover, the coil portions are parallel-connected to one another between the segments, and disposed in such a manner as to be symmetrical with respect to a mechanical angle of 360 degrees.

5 Claims, 12 Drawing Sheets

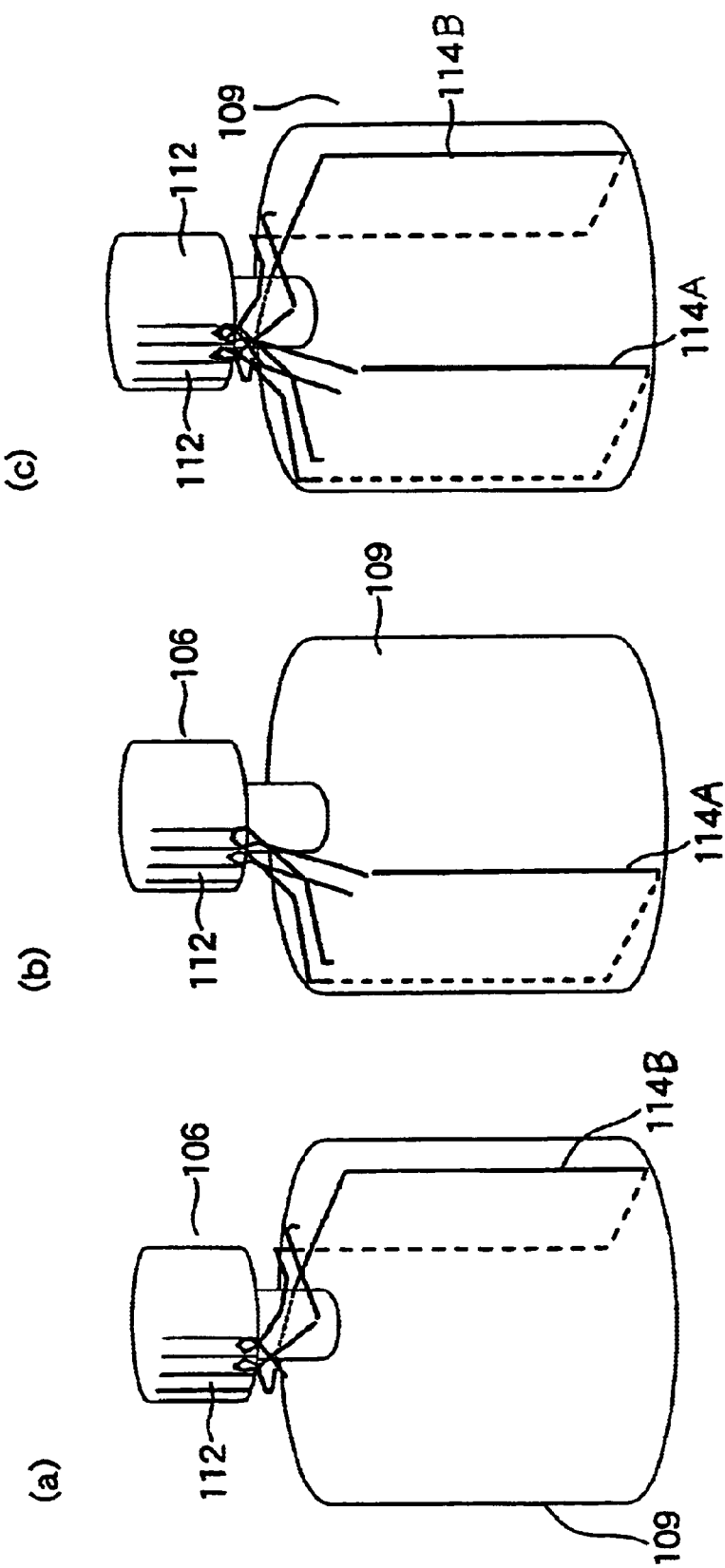

DYNAMO-ELECTRIC MACHINE

BACKGROUND OF THE INVENTION

1. Field of the Invention

The present invention generally relates to a dynamo-electric machine having a commutator that includes a plurality of segments.

2. Description of the Related Art

FIG. 7 is a side sectional diagram of a motor 100 for use in an electric power steering system, which is a conventional dynamo-electric machine. This motor 100 for an electric power steering system comprises a cylindrical yoke 101, magnetic poles 102 constituted by permanent magnets, the number of which is 4, and fixed in this yoke 101, a shaft 104 provided in the yoke 101 in such a manner as to be enabled by a bearing 103 to freely rotate, an armature 105 fixed to this shaft 104, a commutator 106 fixed to an end portion of the shaft 104, and brushes 108 made by elastic forces of springs (not shown) to abut against the surface of this commutator 106 and held by brush holders 107.

The armature 105 comprises a core 109 having twenty-two slots, which axially extend, and a winding 111 constituted by a conductor lap-wound through the slots 110.

The hollow-cylinder-like commutator 106 has twenty-two copper segments 112 disposed at equal intervals, and resin materials, placed between adjacent segments 112, for holding and insulating the adjacent segments 112 from each other.

In the four-pole lap-wound motor 100 for use in the electric power steering system, electric current is externally supplied to the wiring 111 through the brushes 108 that abut against the segments 112. Consequently, the armature 105 rotates together with the shaft 104 by electromagnetic action.

FIGS. 8 and 9 are developed plan winding diagrams each illustrating the cylindrical arrangement of the winding 111, the magnetic poles 102, the communicator 106, and the brushes 108 in the direction of rotation so as to explain the positional relation among the mounting positions of these members.

As shown in FIGS. 8–9, the motor 100 for use in an electric power steering system has twenty-two teeth 113, twenty-two segments 112, and four magnetic poles 102. For easy understanding of the connection relation between the coil portions 114 and the segments 112, this figure shows such an arrangement diroughout a range longer than an actual range, that is, a range of more 360 degrees (720 degrees in this case) in terms of a mechanical angle.

Portions designated by characters "N" and "S" are the magnetic poles 102. Further, parts, each of which is designated by one of symbols "+" and "−" described at the bottom thereof, are the brushes 108. Rectangles, to which the numbers 1 to 22 described under the characters "N" and "S" are respectively assigned, are the teeth 113 for defining the slots 110. Further, rectangles described just above the brushes 108, to which the numbers 1 to 22 are respectively assigned, are the segments 112.

As illustrated in FIG. 10, each of the windings 111 of this example is constituted by what is called "double winding", in which the two coil portions 114 are parallel-connected between each pair of adjacent ones of the segments 112. FIG. 8 is a winding diagram illustrating the outer (or upper) side winding 111 provided in the radial direction of the core 109 of the armature 105, between the windings. FIG. 9 is a winding diagram illustrating the inner (or lower) side winding 111 provided in the radial direction of the core 109 of the armature 105, between the windings.

The windings 111 constituted by the "double winding" has advantages over what is called "single winding" in that thinner conductors can be used, and that thus the workability in winding is enhanced.

Incidentally, in the case of each of the coil portions 114 indicated by dotted lines in FIG. 10, each of the brushes 108 is brought into abutting engagement with two of the segment 112, as shown in FIG. 11. Thus, these segments are at equal electric potential. Consequently, the dotted lines indicate that no current flows through the corresponding wring portion 114.

In the case of this example having a total of twenty-two segments 112, twenty-two coil portions are disposed at each of the upper and lower sides of the winding 111. However, instead of inserting the coil portions 114, which are provided correspondingly to the upper and lower sides, into the same slot, such coil portions 114 are inserted into magnetically symmetrical different slots.

That is, the two coil portions 114 are parallel-connected to each other between the adjacent two segments 112. FIG. 12(a) shows one 114B of the coil portions, which is provided at the lower side. FIG. 12(b) shows one 114A of the coil portions, which is provided at the upper side. FIG. 12(c) shows the coil portion 114B, which is provided at the lower side, and the coil portion 114A, which is provided at the upper side. Further, this figure shows that the upper-side coil portion 114A and the lower-side coil portion 114B are apart from each other by 180 degrees in terms of a mechanical angle.

Meanwhile, attention is now focused on an upper-side coil portion 114A and a lower-side coil portion 114B of the winding 111, which respectively have lead parts 115A and 115B connected between the segment No. 12 and the segment No. 13 of the segments 112. The upper-side coil portion 114A is constructed by winding a conductor a plurality of times between a slot 110, which is formed between the tooth No. 10 and the tooth No. 11 of the teeth 113, and another slot 110, which is formed between the tooth No. 15 and the tooth No. 16 of the teeth 113. Thus, this coil portion 114A is placed nearly just above the segment No. 12 and the segment No. 13 of the segments 112. On the other hand, the lower-side coil portion 114B is constructed by winding a conductor a plurality of times between a slot 110, which is formed between the tooth No. 21 and the tooth No. 22 of the teeth 113, and another slot 110, which is formed between the tooth No. 4 and the tooth No. 5 of the teeth 113. Thus, this coil portion 114B is placed nearly just above the segment No. 1 and the segment No. 2 of the segments 112. That is, the upper-side coil portion 114A and the lower-side coil portion 114B, which employ the segment No. 12 as the common start point and also employ the segment No. 13 as the common end point, are apart from each other by 180 degrees in terms of a mechanical angle.

With such an arrangement, the coil portions 114 rectified with the same timing are always disposed at positions at which mechanical balance is provided, even when inconvenience occurs at the brush 108 at one side or when a subtle deviation in characteristics is caused owing to individual difference. Thus, vibrations due to electromagnetic forces are suppressed.

In the motor 100 of the aforementioned configuration for use in an electric power steering system, the coil portions 114 are always disposed at positions at which mechanical balance is provided, so that vibrations due to electromagnetic forces are suppressed. However, the motor 100 of the aforementioned configuration has drawbacks in that this motor cannot prevent a circulating current from flowing through the brushes 108 by way of electric circuit portions owing to the difference among the voltage induced in the circuit portions among the brushes 108 of the winding, and that magnetic-attraction-force imbalance occurs owing to the difference in the number of coil portions among the circuit portions.

The present invention is created to eliminate the aforementioned drawbacks. Accordingly, an object of the present invention is to provide a dynamo-electric machine that has the coil portions disposed at positions at which mechanical balance is provided, and thus can suppress vibrations due to electromagnetic forces, and that can suppress vibrations caused by imbalance due to electromagnetic forces and that also can suppress imbalance in magnetic attraction forces generated owing to the difference in the number of coil portions among electric circuit portions.

SUMMARY OF THE INVENTION

To this end, according to the present invention, there is provided a dynamo-electric machine comprising: a yoke; magnetic poles fixed in the yoke; a shaft rotatably provided in the yoke; an armature having a winding consisting of a plurality of coil portions each formed by lap-winding a conductor between a corresponding pair of slots formed in an outer circumferential surface portion of a core fixed to the shaft in such a way as to extend in an axial direction thereof; a commutator fixed to an end portion of the shaft and having a plurality of segments to which both end sections of the coil portions are electrically connected; brushes made to respectively abut against the surfaces of the segments of the commutator; and equalizers for connecting the segments, which are to be at equal electric potential, to each other, wherein n (incidentally, "n" is a common divisor of the number of the magnetic poles and the number of the slots and equal to or more than 2) of the coil portions are parallel-connected between said segments, and wherein the coil portions are disposed in such a manner as to be symmetrical with respect to a mechanical angle of 360 degrees.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 12(a) to 12(c) are diagrams each illustrating the positional relation among the coil portions shown in FIG. 7.

DESCRIPTION OF THE PREFERRED EMBODIMENTS

Figure 1:
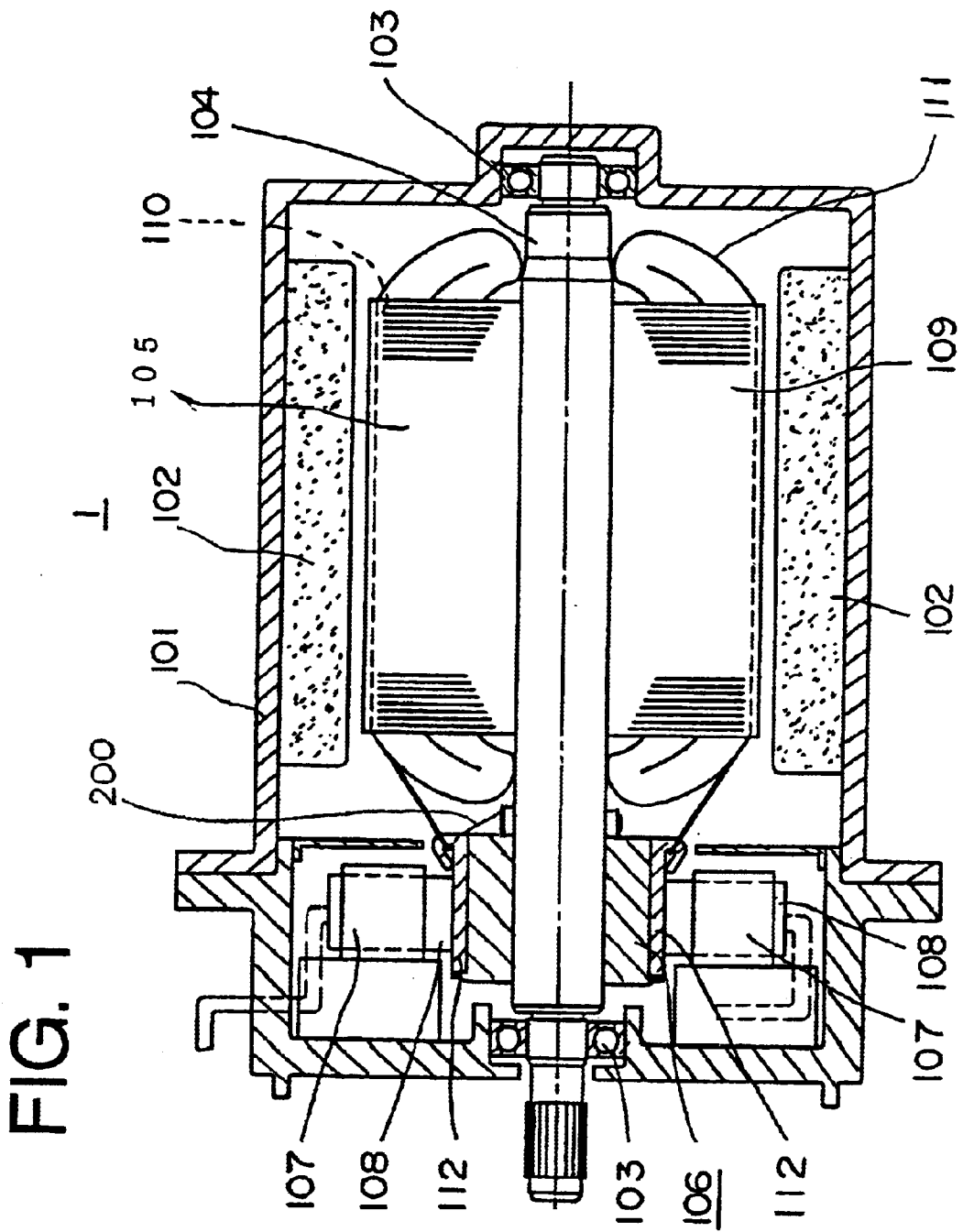
FIG. 1 is a is a sectional diagram illustrating a motor for use in an electric power steering system, which is a first embodiment of the present invention.

Hereinafter, the preferred embodiments of the present invention will be described in detail by referring to the accompanying drawings. Like reference characters designate like or corresponding parts of the conventional dynamo-electric machine.

First Embodiment

FIG. 1 is a sectional diagram illustrating a motor 1, which is a first embodiment of the present invention, for use in an electric power steering system.

This motor 1 for use in an electric power steering system has a cylindrical yoke 101, magnetic poles 102 constituted by permanent magnets, the number of which is 4, and fixed in this yoke 101, a shaft 104 provided in the yoke 101 in such a manner as to be enabled by a bearing 103 to freely rotate, an armature 105 fixed to this shaft 104, a commutator 106 fixed to an end portion of the shaft 104, brushes 108 made by elastic forces of springs (not shown) to abut against the surface of this commutator 106 and held by brush holders 107, and equalizers 200 electrically connecting the segments 112 that are to be at equal electric potential.

The armature 105 comprises a core 109 having twenty-two slots 110, which axially extend, and a winding 111 constituted by a conductor lap-wound through the slots 110.

The hollow-cylinder-like commutator 106 has twenty-two copper segments 112 disposed at equal intervals, and resin materials for insulating the adjacent segments 112 from each other.

In the four-pole lap-wound motor 1 for use in an electric power steering system, electric current is externally supplied to the wiring 111 through the brushes 108 that abut against the segments 112. Consequently, the armature 105 rotates together with the shaft 104 by electromagnetic action.

Figure 2:
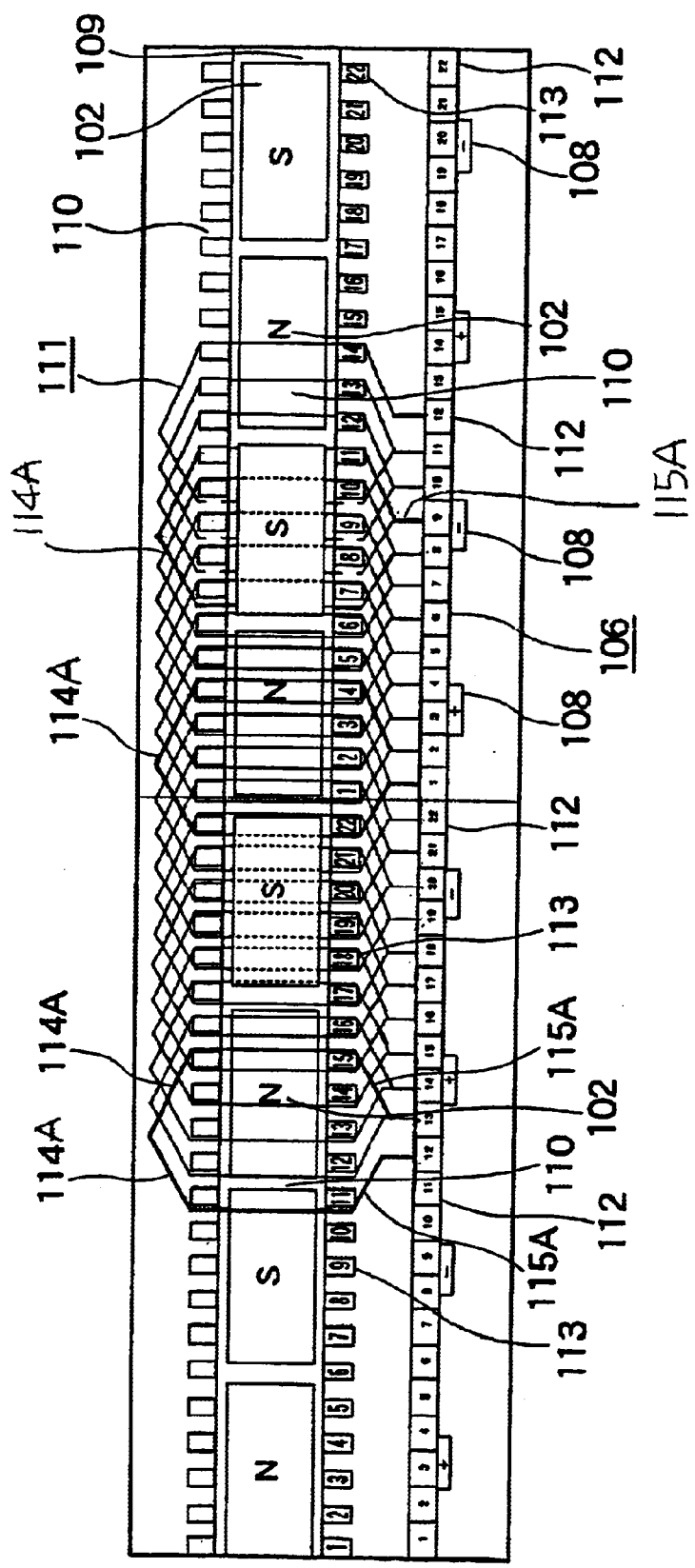
FIG. 2 is a winding diagram illustrating an upper-side winding of the motor shown in FIG. 1 for use in an electric power steering system.
Figure 3:
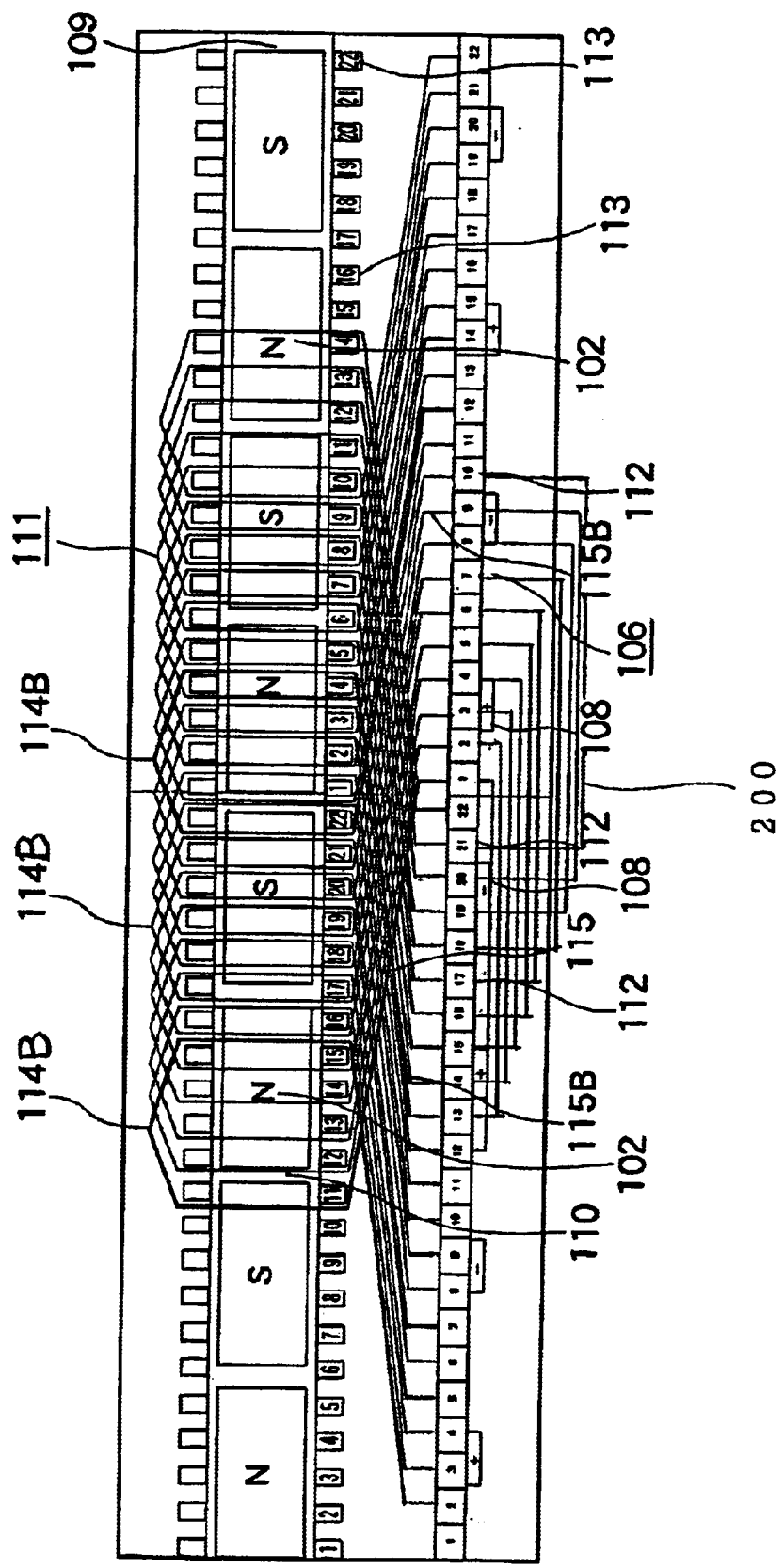
FIG. 3 is a winding diagram illustrating a lower-side winding of the motor shown in FIG. 1 for use in an electric power steering system.

FIGS. 2 and 3 are developed plan winding diagrams each illustrating the cylindrical arrangement of the winding 111, the magnetic poles 102, the communicator 106, and the brushes 108 in the direction of rotation so as to explain the positional relation among the mounting positions of these members.

As shown in FIG. 1, the motor 1 for use in an electric power steering system has twenty-two teeth 113, twenty-two segments 112, and four magnetic poles 102. For easy understanding of the connection relation between the coil portions 114 and the segments 112, this figure shows such an arrangement throughout a range longer than an actual range, that is, a range of more 360 degrees (720 degrees in this case) in terms of a mechanical angle.

Portions designated by characters "N" and "S" are the magnetic poles 102. Further, parts, each of which is designated by one of symbols "+" and "−" described at the bottom thereof, are the brushes 108. Rectangles, to which the numbers 1 to 22 described under the characters "N" and "S" are respectively assigned, are the teeth 113 for defining the slots 110. Further, rectangles described just above the brushes 108, to which the numbers 1 to 22 are respectively assigned, are the segments 112.

Each of the windings 111 of this embodiment is constituted by what is called "double winding", in which the two coil portions 114 are parallel-connected between each pair of adjacent ones of the segments 112. FIG. 2 is a winding diagram illustrating the outer (or upper) winding 111 of the armature 105, which is provided in the radial direction of the core 109, between the windings. FIG. 3 is a winding diagram illustrating the inner (or lower) winding 111 of the armature 105, which is provided in the radial direction of the core 109, between the windings.

The windings 111 constituted by the "double winding" has advantages over what is called "single winding" in that thinner conductors can be used, and that thus the workability in winding is enhanced.

In the case of this embodiment having a total of twenty-two segments 112, twenty-two coil portions 114A and 114B are disposed at the upper side and the lower side of the winding 111, respectively. However, instead of inserting the coil portions 114, which are provided correspondingly to the upper and lower sides, into the same slot 110, such coil portions 114 are inserted into magnetically symmetrical different slots.

Meanwhile, attention is now focused on an upper-side coil portion 114A and a lower-side coil portion 114B, which respectively have the lead parts 115A and 115B connected between the segment No. 12 and the segment No. 13 of the segments 112. The upper-side coil portion 114A is constructed by winding a conductor a plurality of times between a slot 110, which is formed between the tooth No. 10 and the tooth No. 11 of the teeth 113, and another slot 110, which is formed between the tooth No. 15 and the tooth No. 16 of the teeth 113. Thus, this coil portion 114A is placed nearly just above the segment No. 12 and the segment No. 13 of the segments 112. On the other hand, the lower-side coil portion 114B is constructed by winding a conductor a plurality of times between a slot 110, which is formed between the tooth No. 21 and the tooth No. 22 of the teeth 113, and another slot 110, which is formed between the tooth No. 4 and the tooth No. 5 of the teeth 113. Thus, this coil portion 114B is placed nearly just above the segment No. 1 and the segment No. 2 of the segments 112. That is, the upper-side coil portion 114A and the lower-side coil portion 114B, which employ the segment No. 12 as the common start point and also employ the segment No. 13 as the common end point, are apart from each other by 180 degrees in terms of a mechanical angle.

With such an arrangement, the coil portions 114 rectified with the same timing are always disposed at positions at which mechanical balance is provided, even when inconvenience occurs at the brush 108 at one side or when a subtle deviation in characteristics is caused owing to individual difference. Thus, vibrations due to electromagnetic forces are suppressed.

Further, the segments 112 to be put at equal electric potential are electrically connected by the equalizer 200, so that a circulating current is prevented from flowing through circuit portions between the brushes 108 of the winding 114 owing to the difference among voltages induced in the circuit portions. Additionally, an occurrence of magnetic-attraction-force imbalance due to the difference in the number of coil portions 114 among the electric circuit portions is prevented.

Figure 4:
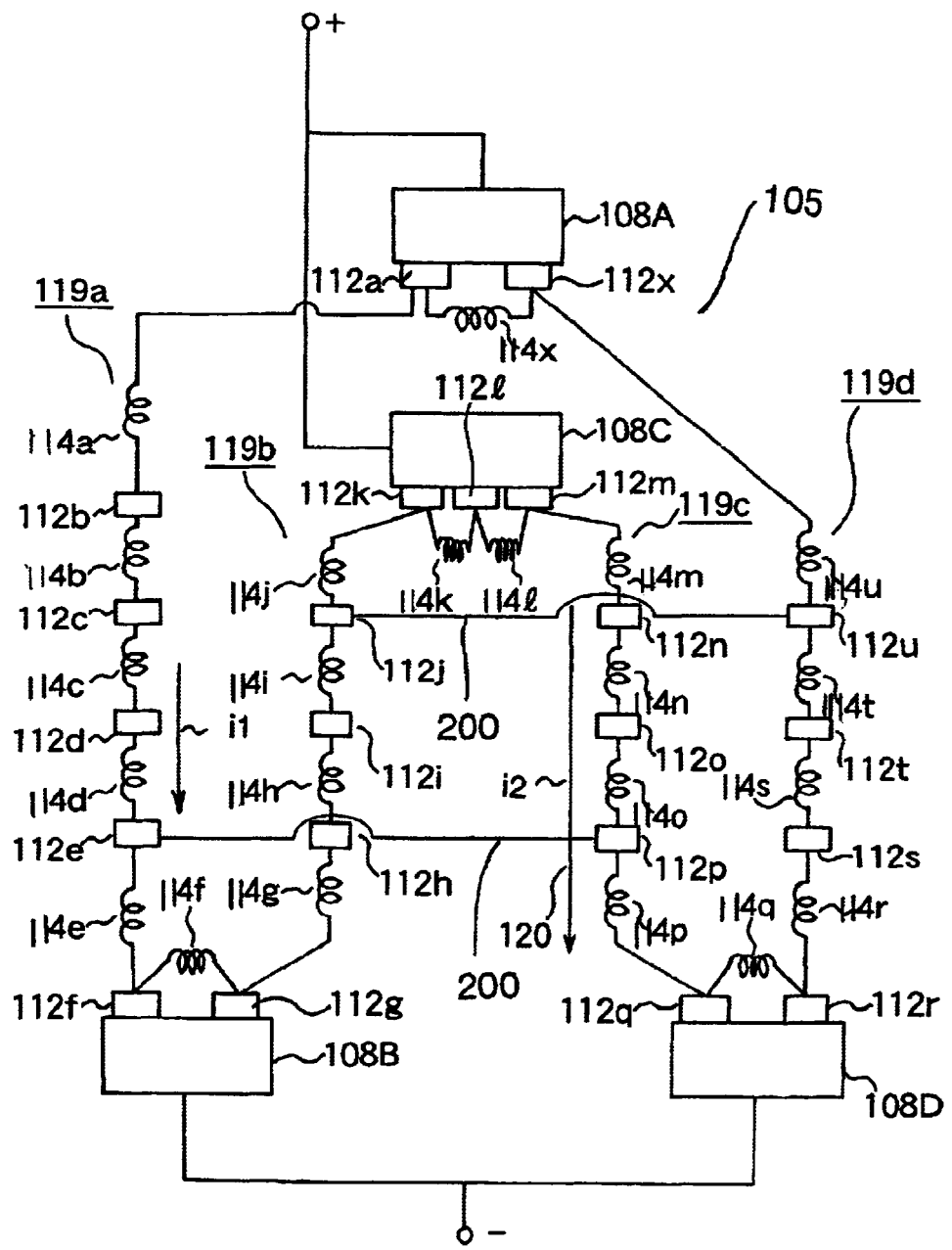
FIG. 4 is a circuit diagram illustrating an electric circuit of the motor shown in FIG. 1 for use in an electric power steering system.

Hereinafter, such features of the first embodiment are described in detail. FIG. 4 is a circuit diagram illustrating an electric circuit in which the coil portions 114 of the armature 105 are connected to the segments 112. In the following description, the following members, that is, explanation is given by respectively adding an alphabetical character to the right side of each of reference numerals designating the brushes, the segments and the coil portions.

For example, in the case that originally, three of the segments 112 should abut against the first brush 108A and the third brush 108C, that two of the segments 112 should abut against the second brush 108B and the fourth brush 108D, only two segments, that is, the first segment 112a and the second segment 112x may abut against the first brush 108A for a moment. As a result, the first to fourth electric circuit portions 119a to 119d among the first to fourth brushes 108A to 108D may differ from one another in the number of the coil portions 114, which should be 4 in each of these electric circuit portions at that time. That is, in the first circuit portion 119a, the first coil portions 114a to the fifth coil portions 114e intervene between the segments 112a and 112f. Thus, five of the coil portions 114 intervene therebetween. Therefore, the value of an electric current i1 flowing through the first electric circuit portion 119a and that of an electric current i2 flowing through the third electric circuit portion 119c, which should be equal to each other, are different from each other. This results in imbalance in magnetic attraction forces acting on the armature 105. Consequently, an exciting force is generated in the armature 105. Thus, operating sounds are produced. However, because, for example, the segments 112e and 112p are electrically connected to each other by the equalizer 200, the voltage level of the segment 112e of the first electric circuit portion 119a is equal to that of the segment 112p of the third electric portion 119c. This results in balanced magnetic attraction forces. Thus, the exciting force is reduced. Incidentally, only two equalizers 200 are shown in FIG. 4, and the remaining ten equalizers are omitted for simplicity of drawing.

Next, a procedure for connecting the coil portions 114 of the armature 105 to the segments 112 and then connecting the segments 112 to each other by the equalizers 200 is described hereinbelow. Incidentally, members made of the same material, that is, enamel-coated round wires are used as the conductor and the equalizer 200. Moreover, the winding 111 and the equalizer 200 are continuously connected to each other.

For example, in FIG. 3 showing the lower (or radially inner side) of the winding 111, the lap-wound coil portion 114B connected to the segment No. 2 of the segments 112 is constituted by winding the conductor a plurality of times between the slot 110, which is provided between the tooth No. 15 and the tooth No. 16 of the teeth 113, and the slot 110 that is provided between the tooth No. 10 and the tooth No. 11 of the teeth 113. Then, the coil portion 114B is connected to the segment No. 1 of the segments 112. Thereafter, the equalizer 200 drawn out from the segment No. 1 of the segments 112 is connected to the segment No. 12 of the segments 112. Subsequently, the construction of the coil portion 114B connected to the segment No. 12 of the segments 112 through the lead part 115B is resumed by further winding the connector a plurality of times between the slot 110, which is provided between the tooth No. 3 and the tooth No. 4 of the teeth 113, and the slot 110 provided between the tooth No. 20 and the tooth No. 21 of the teeth 113. Furthermore, the coil portion 114B is connected to the segment No. 11 of the segments 112. Then, the equalizer 200 drawn out from the segment No. 11 of the segments 112 is connected to the segment No. 22 of the segments 112. Thus, the coil portion 114B is formed by changing the positions of the slots 110 to be used. Consequently, the lower side portion of the winding 111 is manufactured.

Thereafter, the upper side (that is, the radially outer side) portion of the winding 111 is formed. At the upper side, as shown in FIG. 2, the lap-wound coil portion 114A connected to the segment No. 8 through the lead part 115A is constructed by winding the conductor a plurality of times between the slot 110, which is provided between the tooth No. 6 and the tooth No. 7 of the teeth 113, and the slot 110 provided between the tooth No. 11 and the tooth No. 12 of the teeth 113. Then, the coil portion 114A is connected to the segment No. 9 of the segments 112. Subsequently, the construction of the coil portion 114A connected to the No. 9 of the segments 112 is resumed by further winding the conductor a plurality of times between the slot 110, which is provided between the tooth No. 7 and the tooth No. 8 of the teeth 113, and the slot 110 provided between the tooth No. 12 and the tooth No. 13 of the teeth 113. Then, the coil portion 114A is connected to the segment No. 10 of the segments 112. Thus, each of the coil portions 114A is formed by changing the segment to be connected thereto and the slot 110, in which this coil portion is mounted, to the adjoining one of the segments 112 and the adjacent one of the slots 110, respectively. Consequently, the upper side portion of the winding 111 is manufactured.

Figure 5:
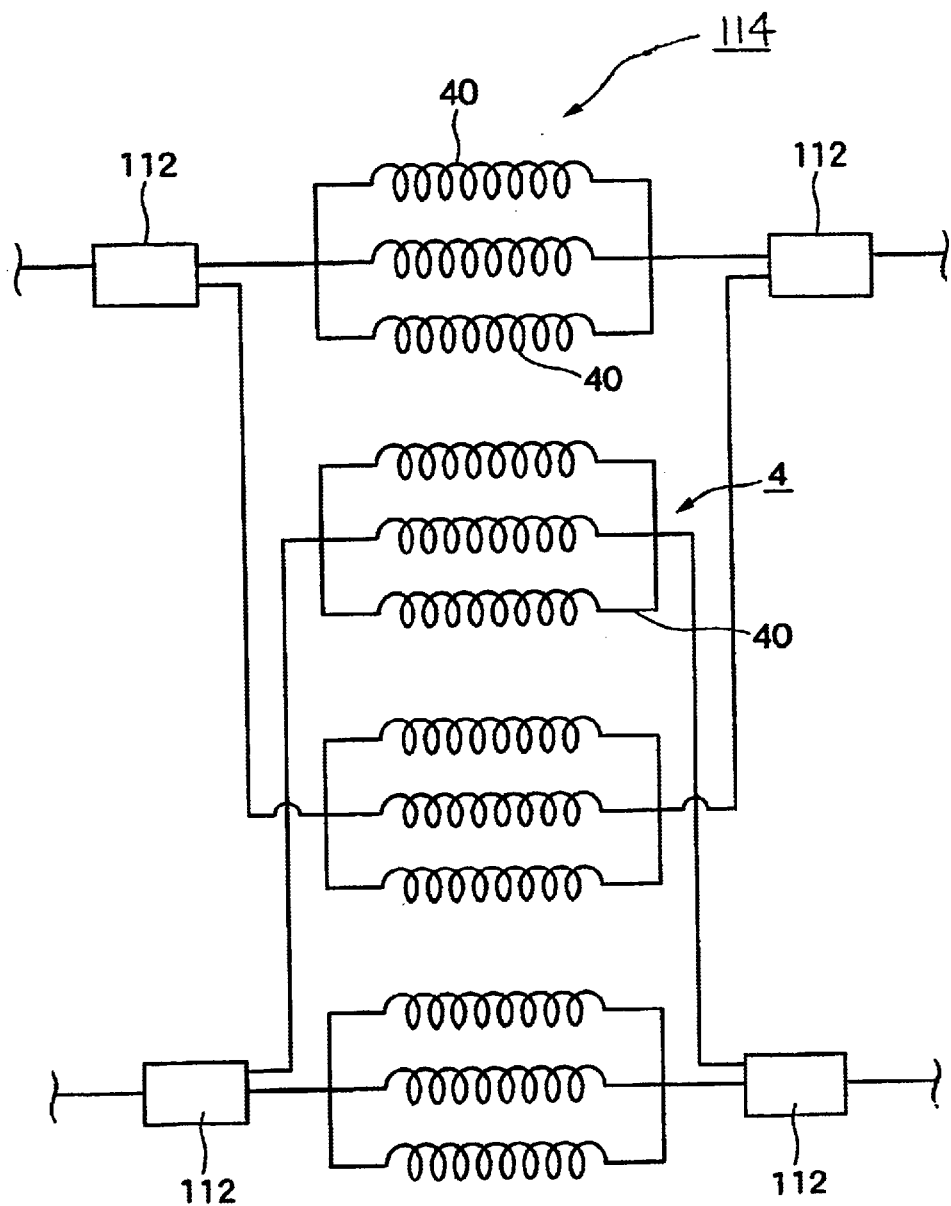
FIG. 5 is a diagram illustrating a modification of parallel-connected coil portions.

Incidentally, as illustrated in FIG. 5, the coil portion 114 may be constituted by a plurality of parallel-connected small coil portions 40. In this case, the embodiment has advantages in that thinner conductors can be used for the small coil portions 40, and that the workability in winding conductors is enhanced.

Figure 6:
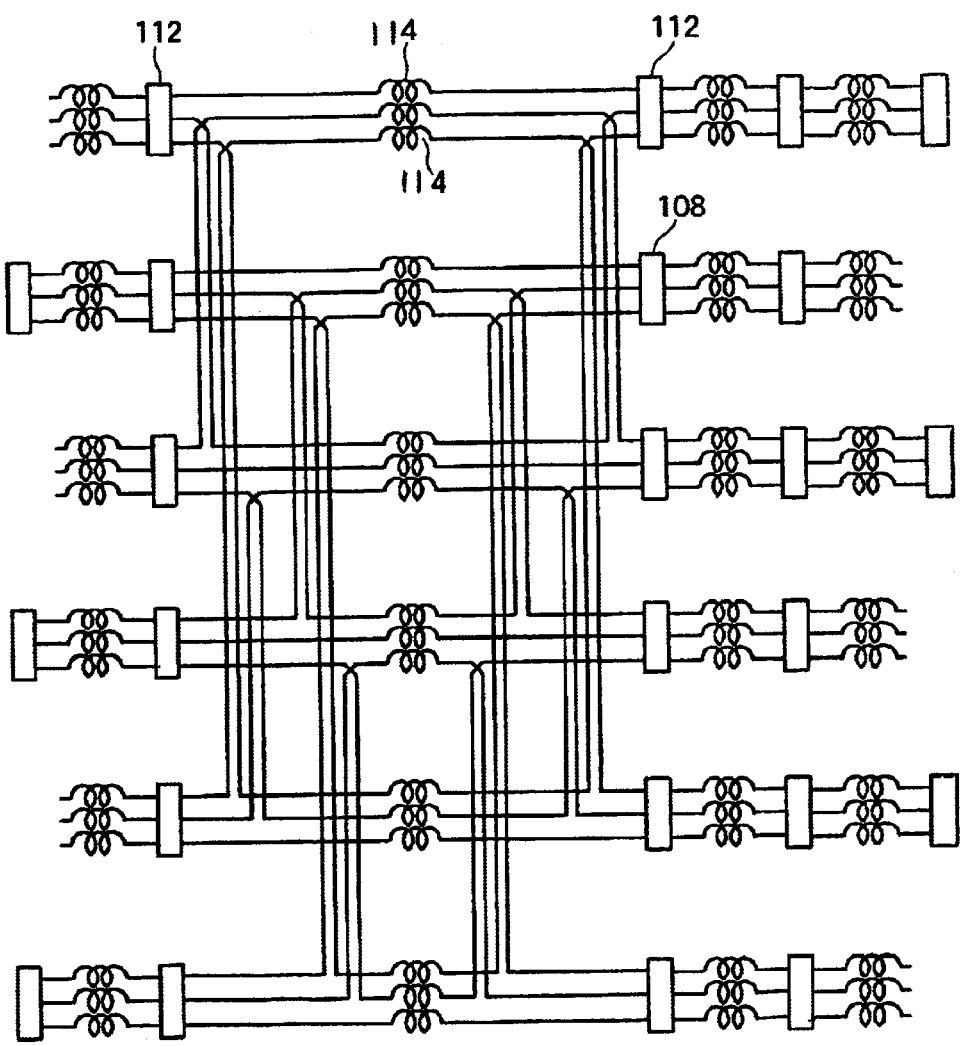
FIG. 6 is a diagram illustrating another modification of parallel-connected coil portions.
Figure 7:
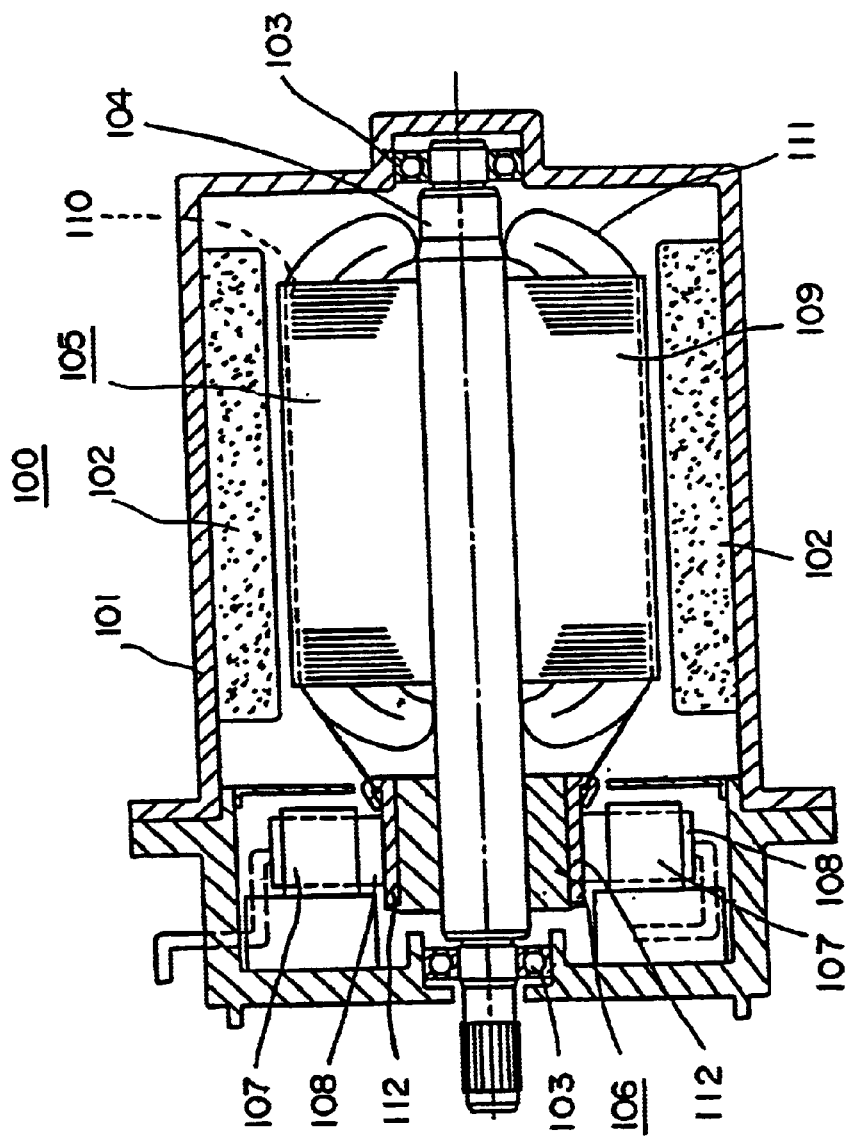
FIG. 7 is a sectional diagram illustrating a conventional motor for use in an electric power steering system.
Figure 8:
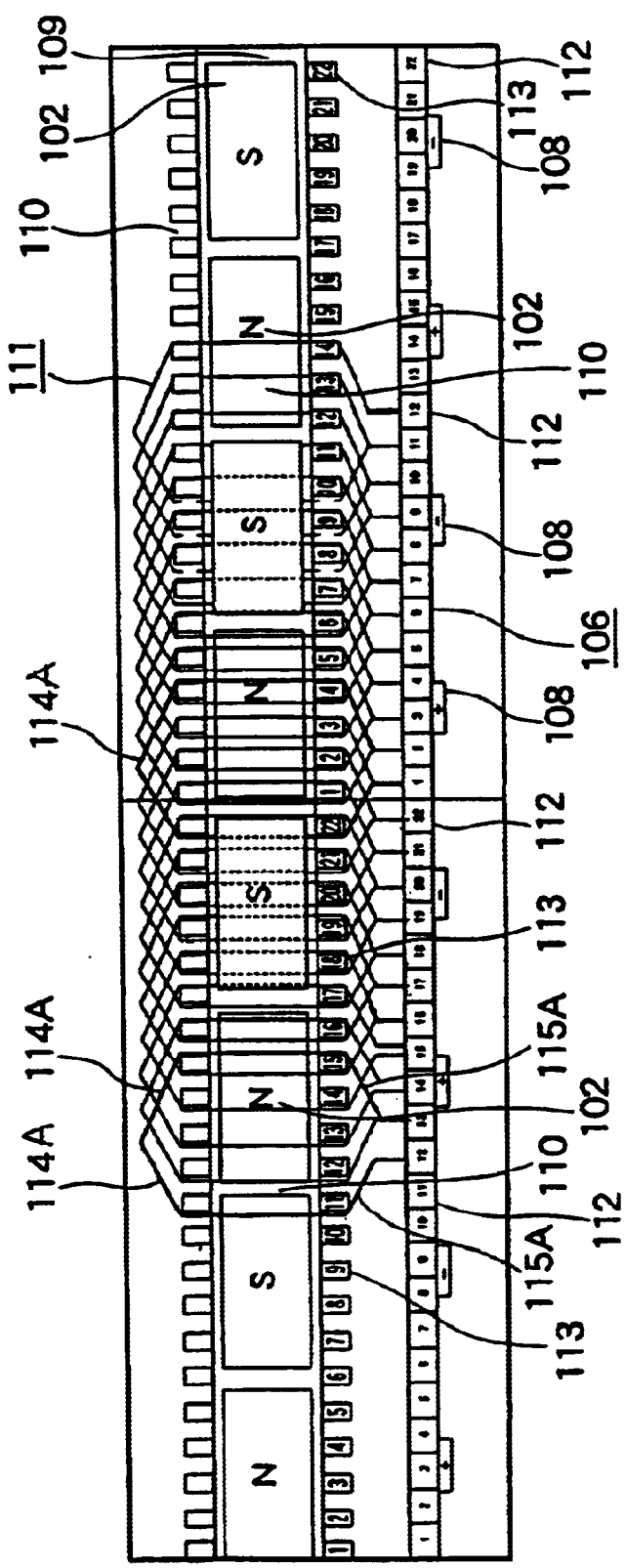
FIG. 8 is a winding diagram illustrating an upper-side winding of the motor shown in FIG. 7 for use in an electric power steering system.
Figure 9:
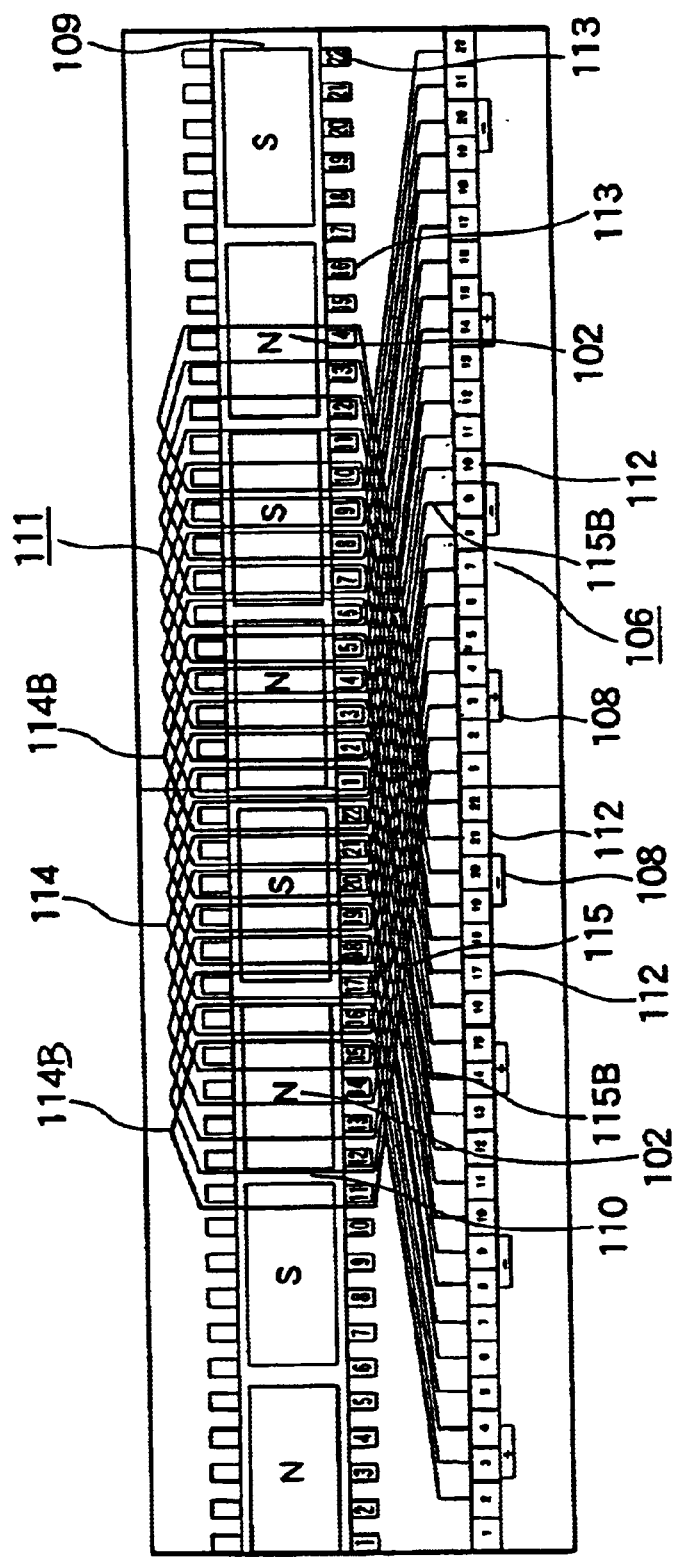
FIG. 9 is a winding diagram illustrating a lower-side winding of the motor shown in FIG. 7 for use in an electric power steering system.
Figure 10:
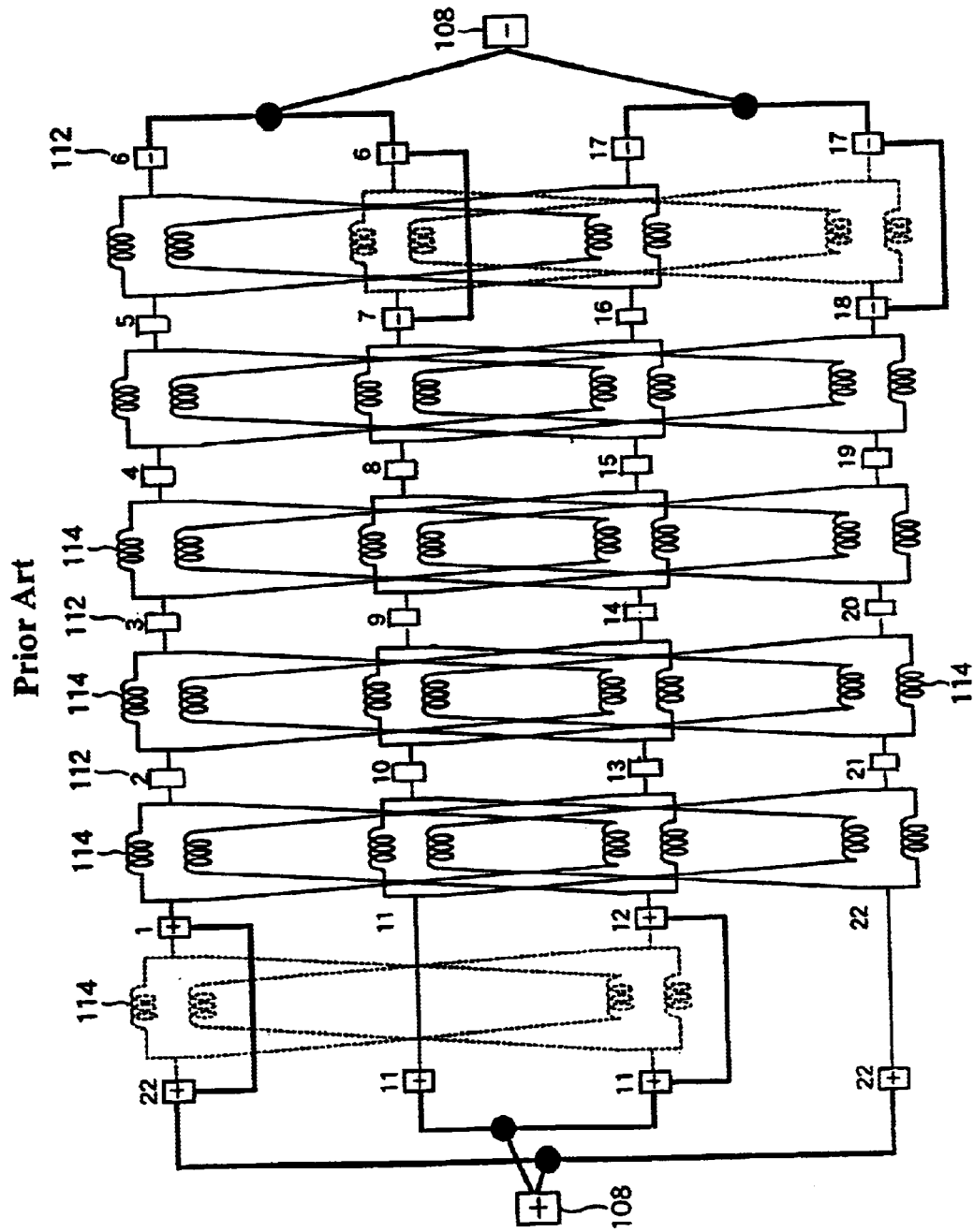
FIG. 10 is a circuit diagram illustrating an electric circuit of the motor shown in FIG. 7 for use in an electric power steering system.
Figure 11:
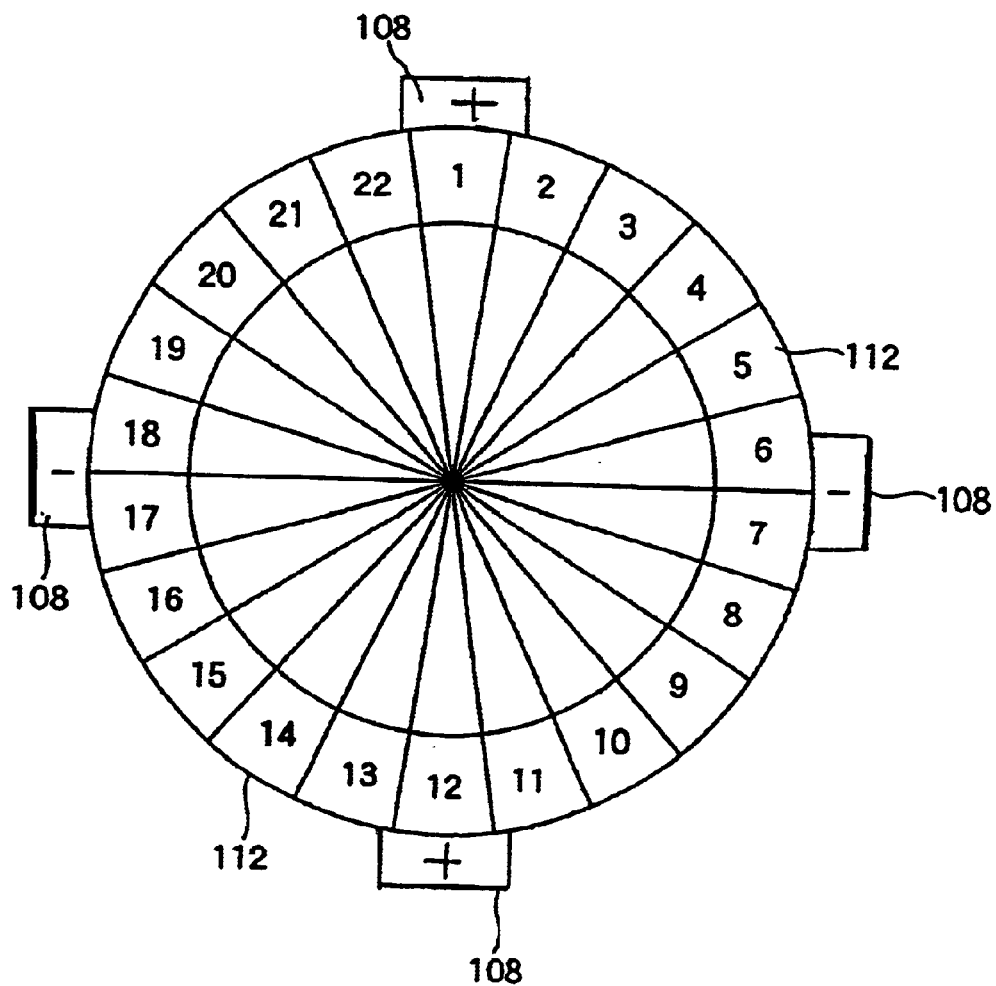
FIG. 11 is a diagram illustrating the relation between the brushes and the segments shown in FIG. 7.

Further, in this embodiment, the number of slots is 22, and the number of poles is 4, and the number of the parallel circuits provided between the segments 112 is 2. That is, the armature 105 comprises parallel-connected two coil portions 114. Needless to say, the invention is not limited to this armature. For instance, in the case that the number of magnetic poles is 6, and that the number of slots is 24 as illustrated in FIG. 6, it is sufficient that the number of parallel circuits is set at 3, and that three coil portions are disposed at angular equal intervals of 120 degrees in terms of a mechanical angle.

Incidentally, it is necessary from the viewpoint of realizing uniform electromagnetic forces that the number "n" of the coil portions 114 provided between the segments 112 is set at a common divisor of the number of magnetic forces 102 and the number of the slots 110. For example, when the number of magnetic poles is 6 and the number of the slots is 24, the common divisors of 6 and 24 are 1, 2, 3, and 6. Thus, the number of the coil portions can be set at 1, 2, 3, or 6. However, when 1 is selected as the number of the coil portions, parallel circuits cannot be provided between the segments 112. Thus, 1 is excluded from the allowable values of the number of the coil portions.

As described above, in a dynamo-electric machine according to one aspect of the present invention, the coil portions are respectively disposed in such a manner as to be symmetrical with respect to a mechanical angle of 360 degrees. Thus, vibrations due to electromagnetic forces are suppressed. Also, the segments which are to be at equal electric potential are electrically connected to each other, by the equalizers Thus, a circulating current is prevented from flowing through circuit portions between the brushes of the winding owing to the difference among voltages induced in the circuit portions, an occurrence of magnetic-attraction-force imbalance due to the difference in the number of coil portions among the electric circuit portions is prevented. Consequently, a quiet dynamo-electric machine is realized. Because change in volume of sounds radiated from the dynamo-electric machine is small even when a load current varies, the dynamo-electric machine of the present invention is effective especially in the case where a load condition frequently changes in a machine, such as an electric power steering system.

According to one form of the dynamo-electric machine, each of the coil portions may comprise a plurality of small coil portions parallel-connected to one another. Thus, the conductors of small coil portions wound around the core become thinner for that. Consequently, the workability in wiring is enhanced still more. Additionally, the miniaturization of the dynamo-electric machine is achieved.

According to another form of the dynamo-electric machine, the number of the slots and the number of the segments may be 22, the number of poles may be 4, two of the coil portions may be parallel-connected between each pair of the segments. Thus, the two coil portions provided between the segments can be disposed at the places at which the two coil portions face each other.

According to still another form of the dynamo-electric machine, the conductor and the equalizer may be constituted by members made of the same material, the winding and the equalizer may be continuously connected to each other. Thus, the efficiency in manufacturing dynamo-electric machines is considerably enhanced.

According to still another form of the dynamo-electric machine, the conductor may be an enamel-coated round wire. Thus, the mechanization of the operation of winding conductors around the core so as to manufacture dynamo-electric machines is facilitated. Further, the mass production of the armatures is enabled. Consequently, the manufacturing cost of the dynamo-electric machines is reduced.

According to still another form of the dynamo-electric machine, the dynamo-electric machine may be a motor for use in an electric power steering system. Thus, a low-noise low-cost highly-reliable motor for use in an electric power steering system is obtained.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A dynamo-electric machine comprising:
 a yoke;
 magnetic poles fixed in said yoke;
 a shaft rotatably provided in said yoke;
 an armature having a winding consisting of a plurality of coil portions each formed by lap-winding a conductor between a corresponding pair of slots formed in an outer circumferential surface portion of a core fixed to said shaft in such a way as to extend in an axial direction thereof;
 a commutator fixed to an end portion of said shaft and having a plurality of segments to which both end sections of said coil portions are electrically connected;
 brushes made to respectively abut against the surfaces of said segments of said commutator; and
 equalizers for connecting said segments, which are to be at equal electric potential, to each other, wherein n of said coil portions are parallel connected between said segments where n is a common divisor of the number of the magnetic poles and the number of the slots and equal to or more than 2, wherein said coil portions are disposed in magnetically symmetrical different slots, and wherein each of said coil portions comprises a plurality of small coil portions parallel-connected to one another.

2. A dynamo-electric machine according to claim 1, wherein the number of the slots and the number of the segments are 22, wherein the number of poles is 4, and wherein two of the coil portions are parallel-connected between each pair of said segments.

3. A dynamo-electric machine according to claim 1, wherein said conductor and said equalizer are constituted by members made of a same material, and wherein said winding is connected to said equalizers.

4. A dynamo-electric machine according to claim 1, wherein said conductor is an enamel-coated round wire.

5. A dynamo-electric machine according to claim 1, which is a motor for use in an electric power steering system.

* * * * *